United States Patent [19]
Koeberer et al.

[11] Patent Number: 5,618,104
[45] Date of Patent: Apr. 8, 1997

[54] METHOD FOR COOLING WHITE CEMENT CLINKER

[75] Inventors: Günther Koeberer; Egbert Steffen, both of Hamburg; Gerhard Bomba, Braunschweig; Franz-Josef Grothaus, Ennigerloh; Gerhard Zakel, Warendorf, all of Germany

[73] Assignee: Krupp Fördertechnik GmbH, Duisburg, Germany

[21] Appl. No.: 427,483

[22] Filed: Apr. 24, 1995

[30] Foreign Application Priority Data

Apr. 23, 1994 [DE] Germany ............... 44 14 292.7

[51] Int. Cl.⁶ ............... B28C 5/46; C04B 2/10
[52] U.S. Cl. ............... 366/7; 366/15; 432/14; 106/741; 106/742
[58] Field of Search ............... 366/2, 3, 4, 6, 366/7, 10, 12, 13, 14, 15, 147, 149, 144; 106/741, 742, 750; 432/78, 77, 14

[56] References Cited

U.S. PATENT DOCUMENTS

| | | | |
|---|---|---|---|
| 3,425,853 | 2/1969 | Rives | 106/742 |
| 3,595,543 | 7/1971 | Tresouthick | 106/750 |
| 3,622,085 | 11/1971 | Rivoire | 106/742 |
| 3,692,286 | 9/1972 | Borreill | 106/741 |
| 3,831,291 | 8/1974 | Kayatz | 432/78 |
| 3,839,803 | 10/1974 | Dick | 432/78 |
| 4,101,337 | 7/1978 | Danø | 106/740 |
| 4,767,462 | 8/1988 | Pons De Vinals | 432/85 |
| 5,201,652 | 4/1993 | Kawamura et al. | 432/78 |

FOREIGN PATENT DOCUMENTS

| | | |
|---|---|---|
| 0165034 | 12/1985 | European Pat. Off. . |
| 1058921 | 6/1959 | Germany . |
| 973814 | 6/1960 | Germany . |
| 2361060 | 6/1975 | Germany . |
| 2404086 | 3/1979 | Germany . |
| 2544343 | 8/1981 | Germany . |
| 3525216 | 5/1986 | Germany . |
| 3526345 | 5/1986 | Germany . |
| 3521587 | 8/1986 | Germany . |
| 3521586 | 8/1986 | Germany . |
| 3522839 | 1/1987 | Germany . |
| 742559 | 12/1955 | United Kingdom . |
| 2167058 | 5/1986 | United Kingdom ............... 106/742 |
| 2167740 | 6/1986 | United Kingdom . |

Primary Examiner—Tony G. Soohoo
Attorney, Agent, or Firm—Spencer & Frank

[57] ABSTRACT

A method of cooling white cement clinker sintered in a rotary kiln includes the following steps: introducing the white cement clinker from the rotary kiln into a first cooling stage; comminuting the white cement clinker in the first cooling stage; quenching the white cement clinker with a coolant in the first cooling stage in a short dwell period in an oxygen-poor environment to a mean temperature of approximately between 650° C. and 750° C.; introducing the white cement clinker from the first cooling stage into a second cooling stage; mixing and simultaneously conveying the white cement clinker in the second cooling stage in an oxygen-poor environment for a period of at least 15 seconds for obtaining a homogeneous mixture of particles of the white cement clinker and for further cooling the white cement clinker to a temperature of approximately between 550° C. and 650° C.; after the mixing and conveying step, introducing the white cement clinker into a third cooling stage; and cooling the white cement clinker in the third cooling stage by an air stream.

11 Claims, 1 Drawing Sheet

METHOD FOR COOLING WHITE CEMENT CLINKER

CROSS REFERENCE TO RELATED APPLICATION

This application claims the priority of German Application No. P 44 14 292.7 filed Apr. 23, 1994, which is incorporated herein by reference.

BACKGROUND OF THE INVENTION

This invention relates to a method of and an apparatus for cooling white cement clinker sintered in a rotary tubular kiln. Conventionally, the white cement clinker is, after its discharge from the kiln, quenched in a first cooling stage by means of a coolant, such as water, in an oxygen-poor environment. In the region of the first cooling stage a comminuting apparatus is provided. In a last cooling stage the white cement clinker is further cooled by air which is subsequently reintroduced into the rotary kiln as combustion air.

A process of the above-outlined type is disclosed in German Patent Nos. 3,521,586 and 3,521,587. The white cement clinker exiting from the rotary kiln is classified into two fractions in a first cooling stage and thereafter the coarse fraction is comminuted in a comminuting device and eventually both fractions are introduced into the last cooling stage for subsequent cooling.

SUMMARY OF THE INVENTION

It is an object of the invention to provide a method and an apparatus of the above-outlined type in which the result of the cooling of white cement clinker sintered in a rotary kiln is improved so that upon entrance into the last cooling stage only a small—if any—temperature difference exists between the individual cement clinker particles and wherein the cement clinker particles should have a temperature which, on the one hand, does not result in a discoloration of the clinker in the last cooling stage and, on the other hand, the clinker particles still contain a possibly large quantity of heat which may be recuperated in the last cooling stage.

This object and others to become apparent as the specification progresses, are accomplished by the invention, according to which, briefly stated, the method of cooling white cement clinker sintered in a rotary kiln includes the following steps: introducing the white cement clinker from the rotary kiln into a first cooling stage; comminuting the white cement clinker in the first cooling stage; quenching the white cement clinker with a coolant in the first cooling stage in a short dwell period in an oxygen-poor environment to a mean temperature of approximately between 650° C. and 750° C.; introducing the white cement clinker from the first cooling stage into a second cooling stage; mixing and simultaneously conveying the white cement clinker in the second cooling stage in an oxygen-poor environment for a period of at least 15 seconds for obtaining a homogeneous mixture of particles of the white cement clinker and for further cooling the white cement clinker to a temperature of approximately between 550° C. and 650° C.; after the mixing and conveying step, introducing the white cement clinker into a third cooling stage; and cooling the white cement clinker in the third cooling stage by an air stream.

Upon leaving the first cooling stage, the temperature of the clinker fraction of the larger particles lies, particularly in the inside, above the above-noted mean temperature, while the temperature of the fraction of the smaller particles is therebelow. The temperatures of the individual clinker particles of the white cement clinker exiting from the second cooling stage have been essentially equalized.

The clinker particles cooled according to the method of the invention have, prior to their entrance into the last cooling stage, such an overall a temperature in which the oxygen has only a small effect—if any at all—on the color of the white cement clinker.

By virtue of the invention—primarily by the heat exchange between the excessively hot and the excessively cold clinker particles in the second cooling stage—the quality of the white cement clinker is, under optimal utilization of heat, significantly improved because the process prevents an uneven temperature distribution in the individual white cement clinker particles due to the relatively short dwelling time of the white cement clinker in the first cooling stage. Such an uneven temperature distribution leads to an oxidation of the iron of the hotter particles, whereas no sufficient heat utilization is achieved in the cooler particles.

According to an embodiment of the invention, the entire clinker batch is, upon discharge from the rotary kiln, passed through the comminuting device. This renders a classifying device unnecessary and further, the apparatus according to the invention may be of smaller vertical construction. With the absence of a classifying apparatus, the disadvantages inherent thereto are also avoided. Thus, a classification of the white cement clinker performed in the hot zone by means of an agitated sieve or grate, requires a complex arrangement, while a rigid grate tends to lead to clogging which, in turn, may cause appreciable disturbances.

The white cement clinker is, before its introduction into the comminuting device and also upon its discharge therefrom, sprayed with a coolant so that the comminuting zone constitutes one part of the first cooling stage.

An optimal regulation of the supply of coolant by means of nozzles provided in the first cooling stages is achieved by measuring the temperature of the white cement clinker in the first cooling stage, and a spraying by a coolant is continued in a controlled manner until the desired outlet temperature of the first cooling stage is reached.

The dwelling time of the white cement clinker in the mixing and conveying section is preferably approximately 30 seconds. During this period the desired temperature equalization takes place by virtue of the mixing process.

According to a further feature of the invention, the cooling of the white cement clinker in the zone of the mixing and conveying section (mixing and conveying device) is performed by evaporation. In this manner, the white cement clinker is substantially dry as it enters the last cooling stage.

According to a further feature of the invention, in the upstream (forward) region of the mixing and conveying section the cooling of the white cement clinker is effected by spraying with a coolant and in a downstream region cooling is effected by evaporation. In this case too, the white cement clinker is substantially dry as it enters the last cooling stage.

The process according to the invention may be further improved by measuring the temperature of the white cement clinker in the second cooling stage, and a controlled spraying of the white cement clinker with a coolant is carried out until the desired outlet temperature of the second cooling stage is reached.

Expediently, slurry removal takes place in the first and second cooling stages. The devices for such a slurry removal are so controlled that a gas exchange is at a possibly low level at a point between the rotary kiln and the first cooling stage, on the one hand, and at a point between the second cooling stage and the third (or last) cooling stage, on the other hand.

According to a further improvement of the process according to the invention, prior to the introduction of the white cement clinker into the second cooling stage, the insufficiently burnt clinker particles are removed.

In order to recuperate a part of the heat energy taken up by the white cement clinker during sintering, according to a further feature of the invention the residual heat still present in the white cement clinker in the last cooling stage is admitted to the rotary kiln as a preheated combustion air.

The apparatus for performing the method according to the invention includes a rotary tubular kiln, a first cooling device including a comminuting device as well as a last cooling device. Between the first cooling device and the last cooling device a mixing and conveying device is provided.

According to a preferred embodiment of the apparatus according to the invention the first cooling device is provided with a temperature measuring device which is operatively connected with nozzles arranged in the first cooling device.

The mixing and conveying section (device) may be formed of a drum, a conveyor screw or a mixer, such as a plowshare mixer or the like. Expediently, the mixing and conveying section is designed as a mixing screw.

The drum, conveyor screw or similar device forming the mixing and conveying section may be provided in its entirety or in part with a dual jacket through which the coolant may be passed.

In the zone of the mixing and conveying section, cooling of the white cement clinker is performed by evaporation. The mixing and conveying section, however, may also be provided with nozzles for the introduction of a coolant in which case, according to another feature of the invention, the nozzles are provided only in the upstream zone of the mixing and conveying section. In the latter case, a further cooling of the white cement clinker by means of evaporation is performed only in the downstream section of the mixing and conveying section.

An optimal regulation of the supply of coolant through the nozzles provided in the mixing and conveying section is achieved by providing a temperature measuring device which is situated in the mixing and conveying section and is operatively connected with the nozzles.

In accordance with a particularly advantageous embodiment of the apparatus according to the invention, in the upper zone of the first cooling device and in the downstream (rear) zone of the mixing and conveying section at least one slurry removing arrangement is provided. In this manner, a gas exchange between the first cooling device and the mixing and conveying section and a gas exchange between the mixing and conveying section and the last cooling device is significantly reduced. The setting of the volume of the slurry to be removed is performed either manually or as a function of pressure while monitoring the gas composition.

The apparatus according to the invention may be further improved by providing in the lower zone of the first cooling device a removal device for withdrawing the insufficiently burnt clinker. Expediently, the removal device includes a grate which is formed of a plurality of rotatable, cross-sectionally rectangular, grate bars (slats) whose cross-sectional areas are set vertically in the normal operational condition while, for removing the insufficiently burnt clinker, they assume an oblique orientation. The grate is coupled with a shut-off gate which opens only when the grate is again closed. The shut-off gate prevents excessive air from entering into the first or the second cooling zone, as the case may be.

In order to prevent air from entering from the last cooling device into the mixing and conveying section, a gate lock is provided between the mixing and conveying section and the last cooling device.

The last cooling stage may be formed by a grate cooler, a drum cooler or the like. In a preferred embodiment of the apparatus according to the invention, the last cooling stage is formed by a grate cooler. In such a construction the cooling is performed by a transverse flow.

In order to be able to utilize, for the preheating of the combustion air, the residual clinker heat which the white cement clinker still contains upon its entrance into the last cooling device, in accordance with a further feature of the invention, the last cooling device is connected with the rotary kiln by a tubular conduit including a dust separator.

DESCRIPTION OF THE PREFERRED EMBODIMENT

Figure 1:
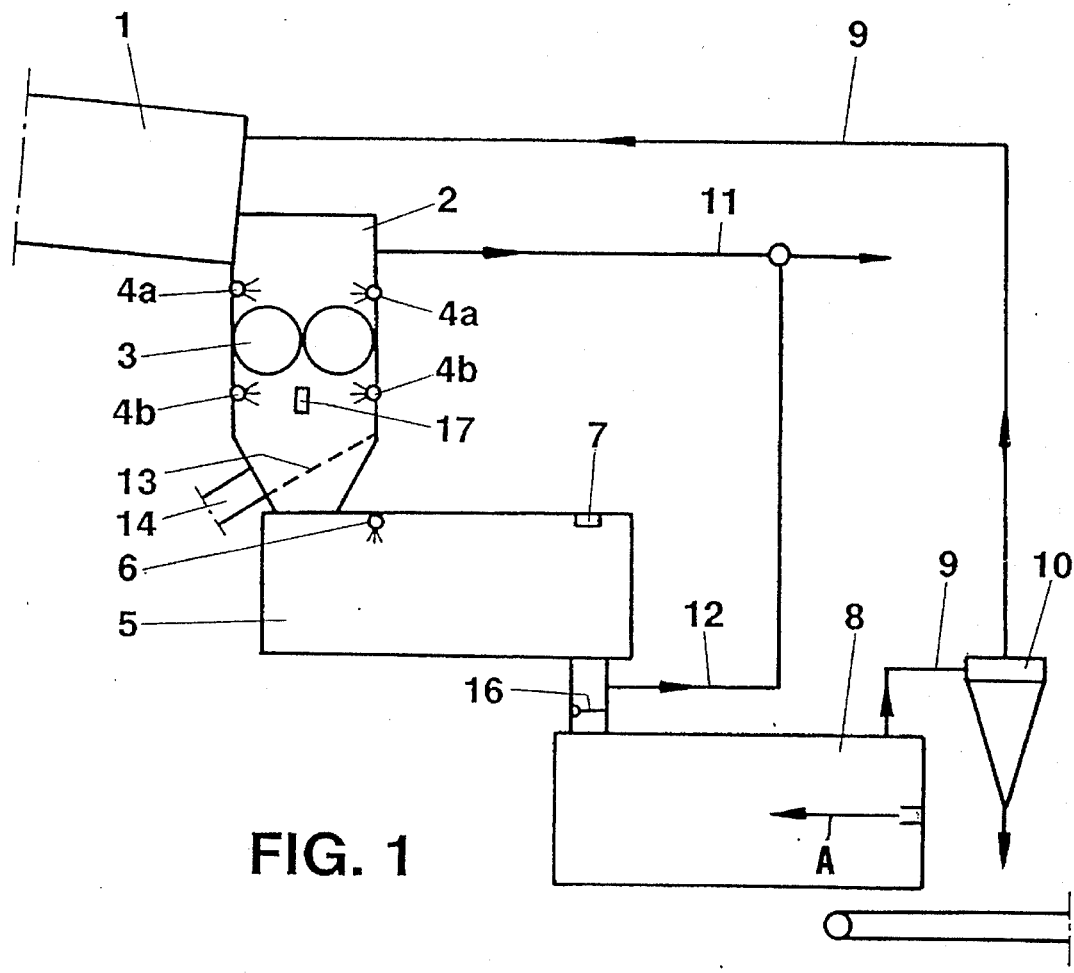
FIG. 1 is a schematic side elevational view of a preferred embodiment of the apparatus for performing the method according to the invention.

Turning to FIG. 1, the apparatus shown therein includes a rotary tubular kiln 1 in which the white cement clinker is sintered. The kiln 1 is adjoined by a first cooling device 2 in which, for exposing the material to a coolant, a plurality of respective nozzles 4a and 4b are arranged upstream and downstream of a comminuting device 3. In the first cooling device 2 a temperature measuring device 17 is mounted which is operatively connected with the nozzles 4a. The first cooling device 2 opens into a mixing and conveying section (mixing and conveying device) 5, in the upstream zone of which further nozzles 6 are provided for introducing a coolant. Further, in the mixing and conveying section 5 a temperature measuring device 7 is provided which is operatively connected with the nozzles 6 and/or with the nozzles 4b by a control arrangement which, in a manner conventional in itself, regulates the coolant output of the nozzles. The mixing and conveying section 5 is adjoined by a last cooling device 8 in which cooling by an air stream A occurs in a transverse or counterflow process. The recuperated clinker heat is introduced into the kiln 1 by means of a conduit 9. For the separation of the clinker particles in the conduit 9 at least one dust separator 10 is provided. The regulation of the quantity and pressure of the preheated combustion air (secondary air) is effected by means of a frequency-regulated fan.

In the upper zone of the first cooling device 2 and in the downstream zone of the mixing and conveying device 5 respective slurry removing arrangements 11 and 12 are provided which are conventional by themselves.

The lower zone of the first cooling device 2 has a removal device 13 for withdrawing insufficiently burned clinker. The device comprises an outlet nipple 14 leading out of the cooling device 2. Between the mixing and conveying section 5 and the last cooling device 8 a pivotal shutoff gate 16 is provided.

Figure 2:
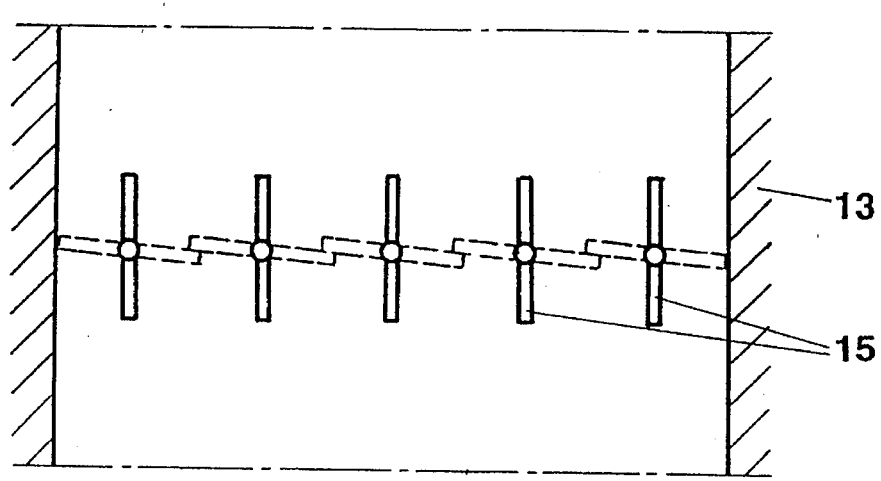
FIG. 2 is a schematic sectional elevational view of an enlarged detail of the apparatus shown in FIG. 1.

FIG. 2 illustrates the removal device 13 as seen from the outlet nipple 14. The removal device 13 is formed of a series of rotatable slats (grate bars) 15. In the normal operating state of the apparatus, the large surfaces of the slats 15 are in a vertical orientation as shown in solid lines. This allows the clinker to pass vertically through the grate bars 15 into the mixing and conveying section 5. When insufficiently burned clinker particles are to be withdrawn, the slats 15 are rotated approximately 90° into their phantom-line position so that their large surfaces form a continuous, oblique slide, deflecting the material into the outlet nipple 14.

It will be understood that the above description of the present invention is susceptible to various modifications, changes and adaptations, and the same are intended to be comprehended within the meaning and range of equivalents of the appended claims.

What is claimed is:

1. A method of cooling white cement clinker sintered in a rotary kiln, comprising the following steps:
   (a) providing first, second and third cooling stages;
   (b) providing a comminuting device in said first cooling stage and a mixing and conveying device in said second cooling stage;
   (c) introducing the white cement clinker from the rotary kiln into a first cooling stage;
   (d) comminuting the white cement clinker in the first cooling stage;
   (e) quenching the white cement clinker with a coolant in the first cooling stage in an oxygen-poor environment to a mean temperature of approximately between 650° C. and 750° C.;
   (f) introducing the white cement clinker from the first cooling stage into a second cooling stage;
   (g) mixing and simultaneously conveying the white cement clinker in said second cooling stage in an oxygen-poor environment for a period of at least 15 seconds for obtaining a homogeneous mixture of particles of the white cement clinker and for further cooling the white cement clinker in said second cooling stage to a temperature of approximately between 550° C. and 650° C.;
   (h) after step (g), introducing the white cement clinker into a third cooling stage; and
   (i) cooling the white cement clinker in the third cooling stage by an air stream.

2. The method as defined in claim 1, wherein step (c) comprises the step of forming a stream of white cement clinker and step (d) comprises the step of comminuting the stream of white cement clinker in its entirety upon discharge thereof from said rotary kiln.

3. The method as defined in claim 1, further comprising the following steps:
   (j) measuring the temperature of the white cement clinker in said first cooling stage; and
   (k) spraying the white cement clinker with a coolant until a desired exit temperature of the white cement clinker from the first cooling stage is reached.

4. The method as defined in claim 1, wherein said period in step (g) is approximately 30 seconds.

5. The method as defined in claim 1, further comprising the step of cooling the white cement clinker by evaporating the coolant therefrom during the performance of step (g).

6. The method as defined in claim 1, wherein said second cooling stage has consecutive upstream and downstream portions as viewed in a conveying direction of the white cement clinker; further wherein step (g) is performed along the consecutive upstream and downstream portions; further comprising the steps of cooling the white cement clinker in the upstream portion by spraying the white cement clinker with a coolant and cooling the white cement clinker in the downstream portion by evaporating the coolant from the white cement clinker.

7. The method as defined in claim 1, further comprising the following steps:
   (j) measuring the temperature of the white cement clinker in said second cooling stage; and
   (k) spraying the white cement clinker with a coolant until a desired exit temperature of the white cement clinker from the second cooling stage is reached.

8. The method as defined in claim 1, further comprising the step of removing a gaseous slurry formed within at least one of the first and the second cooling stages.

9. The method as defined in claim 8, further comprising the step of regulating the slurry removing step such that at a location between the rotary kiln and the first cooling stage and at a location between the second and third cooling stages an exchange of gas entrained by the white cement clinker is maintained at a minimum value.

10. The method as defined in claim 1, wherein said white cement clinker has sufficiently burnt and insufficiently burnt particles;. further comprising the step of removing the insufficiently burnt white cement clinker particles upstream of the second cooling stage as viewed in a direction of clinker flow for preventing the insufficiently burnt white cement clinker particles from entering into said second cooling stage.

11. The method as defined in claim 1, further comprising the step of introducing the air stream, heated in the third cooling stage by residual heat in the white cement clinker, into the rotary kiln as combustion air.

* * * * *